United States Patent
Jones

(10) Patent No.: US 6,267,224 B1
(45) Date of Patent: Jul. 31, 2001

(54) APPARATUS FOR SEPARATING AND ORIENTING POUCHED ARTICLES

(76) Inventor: David A. Jones, 414 Allgood Street, Richmond Hill (CA), M4C 2Z2

( * ) Notice: Subject to any disclaimer, the term of this patent is extended or adjusted under 35 U.S.C. 154(b) by 0 days.

(21) Appl. No.: 08/834,511

(22) Filed: Apr. 4, 1997

(51) Int. Cl.[7] ................................................. B65G 47/12
(52) U.S. Cl. ......................................................... 198/443
(58) Field of Search .............................. 198/396, 397.01, 198/400, 443, 444, 460.1, 461.2, 463.5, 459.5

(56) References Cited

U.S. PATENT DOCUMENTS

| | | | | |
|---|---|---|---|---|
| 1,669,087 | * | 5/1928 | Hungerford | 198/400 |
| 2,633,971 | * | 4/1953 | Albertoli et al. | 198/396 |
| 2,843,254 | * | 7/1958 | Vaughan | 198/400 |
| 3,162,292 | * | 12/1964 | Lawson | 198/443 |
| 3,184,034 | * | 5/1965 | Stuller et al. | 198/443 |
| 4,593,805 | * | 6/1986 | Huddle | 198/400 |
| 4,660,712 | * | 4/1987 | Braidotti et al. | 198/443 |

* cited by examiner

Primary Examiner—Jospeh E. Valenza
(74) Attorney, Agent, or Firm—Jeffrey T. Imai

(57) ABSTRACT

An apparatus for separating flexible packages has a first stage. The first stage has an inclined conveyor having a lower end for receiving flexible packages and an upper end. The inclined conveyor has an inclination sufficient for causing an overlying flexible package to slide relatively to an underlying flexible package as the flexible packages travel from the lower end to the upper end. A drum is rotatably mounted for receiving the flexible packages from the upper end. The drum has a plurality of radially extending resilient paddles for successively engaging and carrying the flexible packages as the drum rotates. The successive engagements and rotation vibratingly separate the flexible packages and discharges a stream of substantially separated flexible packages.

17 Claims, 4 Drawing Sheets

APPARATUS FOR SEPARATING AND ORIENTING POUCHED ARTICLES

FIELD OF THE INVENTION

The present invention relates to a package handling device for separating and orienting flexible pouched articles. In particular, the present invention provides an apparatus for mechanically separating and orientating pouched articles for individually inserting each pouched article into a container such as a bag or box.

BACKGROUND OF THE INVENTION

Many products are packaged in flexible pouches or sealed bags or envelopes. Typically, these pouches are of a rectangular shape and contain food products such as seasonings, salad dressings, cereals, and candies. For example, a caesar salad kit includes a foil pouch of salad dressing, a cellophane pouch of croutons, a foil envelope of seasonings, all packaged in a cellophane bag of chopped romaine lettuce. However, each of these items must be hand sorted and manually placed within the cellophane bag for sealing. The reliance on manual labour increases food packaging time and costs.

There does not exist an automated machine which can separate and orient pouched product for insertion into a recipient container. The flexibility of the pouch prevents effective sorting and handling. As a pouch is handled, it changes shape and clumps together making it difficult to separate the pouched products and then orient them so that each can be inserted into a recipient container one at a time.

There are prior art devices which separate and orient hard-surfaced objects such as wooden flat holder sticks or nuts and bolts. For example, U.S. Pat. No. 4,729,501, Lowrance, provides an automatic feeder apparatus for automatically inserting flat holder sticks into individual food products such as ice cream bars and wieners. This device uses a series of agitator rollers having a plurality of circumferentially spaced longitudinal-shaped flutes which agitates the unaligned sticks and discharges the sticks onto a set of ramps to slide into a slot. This device would not be suitable for flexible items since the flexible items would tend to clump together and be delivered in bunches of two or more.

SUMMARY OF THE INVENTION

The disadvantages of the prior art may be overcome by providing a novel apparatus for the separation and orientation of pouched articles.

According to one aspect of the invention, there is provided an apparatus for separating flexible packages having a first stage which has an inclined conveyor having a lower end for receiving flexible packages and an upper end. The inclined conveyor has an inclination sufficient for causing an overlying flexible package to slide relatively to an underlying flexible package as the flexible packages travel from the lower end to the upper end. A drum is rotatably mounted for receiving the flexible packages from the upper end. The drum has a plurality of radially extending resilient paddles for successively engaging and carrying the flexible packages as the drum rotates. The successive engagements and rotation vibratingly separate the flexible packages and discharges a stream of substantially separated flexible packages.

According to another aspect of the invention, there is provided an apparatus for separating flexible packages having a plurality of stages operably connected together to serially process the flexible packages. Each stage has an inclined conveyor having a lower end for receiving flexible packages and an upper end. The inclined conveyor has an inclination sufficient for causing an overlying flexible package to slide relatively to an underlying flexible package as the flexible packages travel from the lower end to the upper end. A drum is rotatably mounted for receiving the flexible packages from the upper end. The drum has a plurality of radially extending resilient paddles for successively engaging and carrying the flexible packages as the drum rotates. The successive engagements and rotation vibratingly separate the flexible packages and discharges a stream of substantially separated flexible packages.

BRIEF DESCRIPTION OF THE DRAWINGS

Drawings which illustrate embodiments of the present invention will now be described, by way of example only, with reference to the attached Figures, wherein.

DETAILED DESCRIPTION OF THE INVENTION

Figure 1:
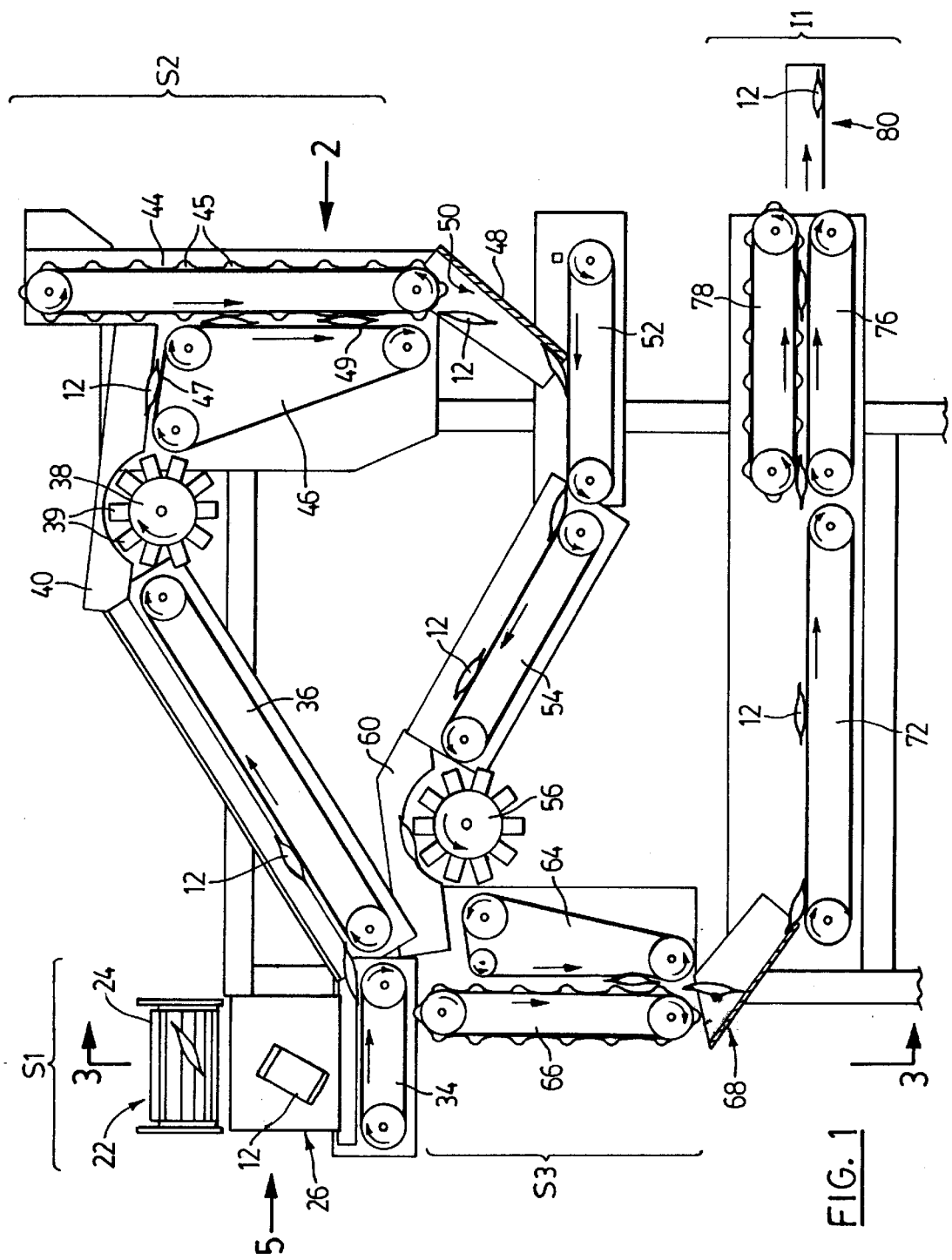
FIG. 1 is a side elevational view of an apparatus for separating and orienting pouched products in accordance with the present invention.

Referring to FIG. 1, the present invention is generally illustrated. The apparatus of the present invention generally comprises a metal frame 6 for supporting the parts of the apparatus. The apparatus generally comprises a first stage S1, a second stage S2, a third stage S3 and an injector I1. The stages are operably connected together for serial processing of the stream of flexible pouches. The stages define a path of a stream of pouches flowing from an upstream end to a downstream end at injector I1.

Figure 2:
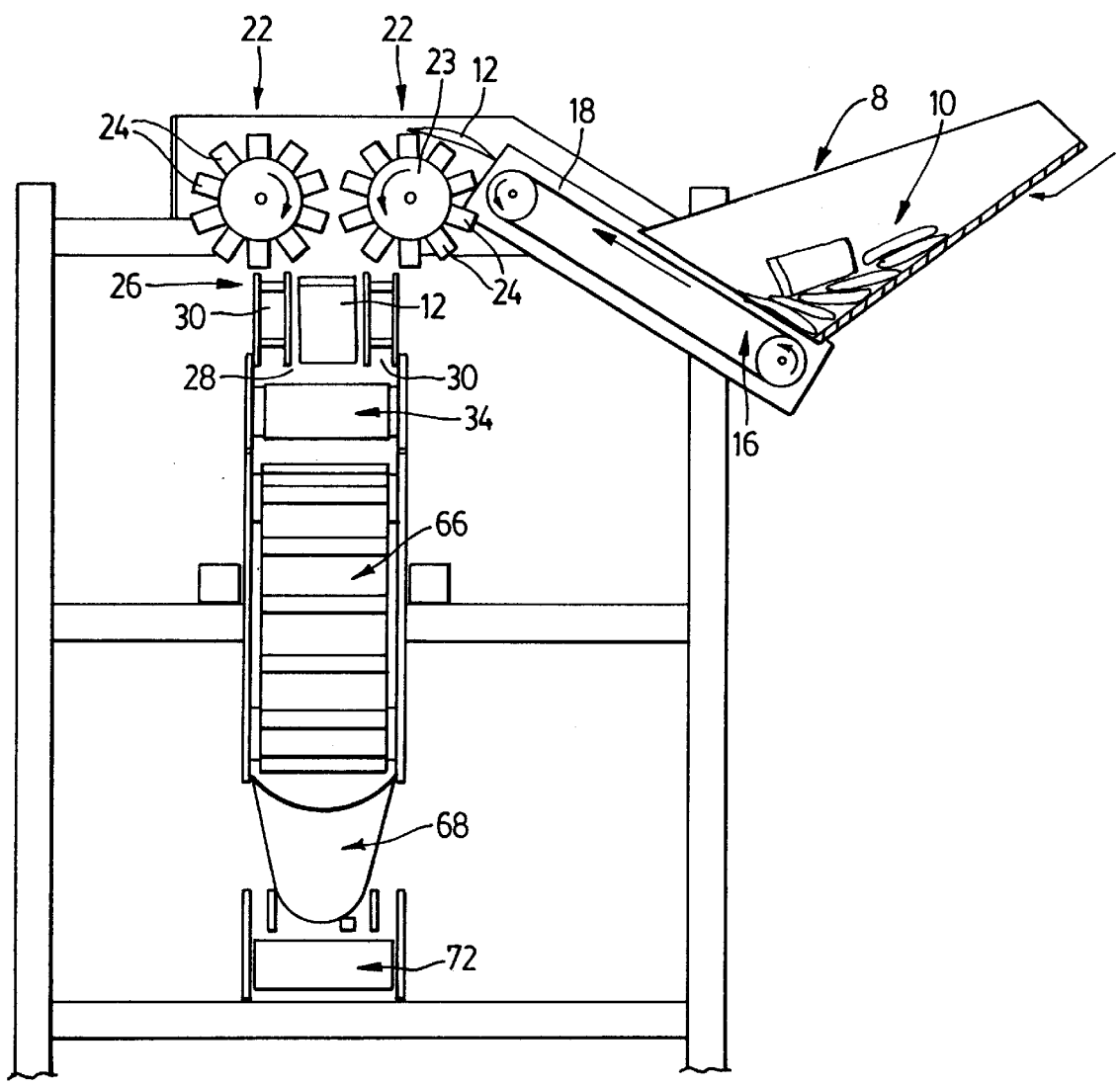
FIG. 2 is an end elevational view of a first stage of the apparatus of FIG. 1.

Referring to FIG. 2, the first stage S1 is illustrated. The first stage S1 comprises a hopper 8 is mounted on frame 6 having an open bottom 14 for gravity feeding of the pouches 12 onto conveyor 16.

Pouches 12 are preferably flexible pouched products which have an outer membrane for containing the contents thereof. The products are normally relatively thin, having a length greater than a width greater than a thickness. It is understood that pouches 12 could be any configuration and could range in flexibility.

Conveyor 16 transports the pouches on the conveyor belt 18. Conveyor belt 18 has a plurality of transverse ridges 20 to frictionally engage the surface of the pouches 12. Inclined conveyor 16 transports pouches 12 towards a pair of spaced counter rotating drums 22.

The conveyor surface 18 has a coefficient of friction greater than the coefficient of friction of the surfaces of the pouches 12 themselves. This difference in frictional coefficients facilitates the force of gravity to cause stacked or overlapping pouches 12 to slide downwardly relative to one another staggering the pouches 12.

Each drum 22 is an elongated with a series radially extending flexible paddles 24 running along the length of each drum 22. The paddles 24 are fabricated from a resilient material, such as rubber or a coated closed cell foam material, to permit paddles 24 to deform as pouches 12 are fed between the counter-rotating drums 22. It is further contemplated that the paddles 24 may be a series of cylindrical teeth and manufactured from rubber or polyurethane foam. It is contemplated that the size, shape, and flexibility of the paddles 24 and the spacing of the drums 22 may be adjusted to accommodate different types and sizes of flexible packages.

Mounted immediately below drums 22 for receiving pouches which have passed therebetween is orienting guides 26 and conveyer 34. Guides 26 comprises a pair of walls 30 which define a channel 28. The separation of the wall surfaces 30 is generally equal to the width of the pouches 12. Guides 26 orient pouches 12 as each falls from between drums 22 to conveyor 34.

Discharge conveyor 34 is positioned below drums 22 and receives the pouched products 12 from drums 22. Discharge conveyor 34 rotates in the direction of the arrow to feed pouches 12, which are oriented in a longitudinal direction to the second stage S2.

Stage S2 comprises an inclined conveyor 36, which is similar in construction to the inclined conveyor 16. The inclined conveyor 36 operates in a manner similar to inclined conveyor 16 to separate bunched or overlying pouches 12 which were missed by the first stage S1.

Inclined conveyor 36 transports the pouches 12 towards rotating drum 38. Drum 38 has a number of radially extending paddles 39 which are similar in construction to the paddles 24 of counter-rotating drums 22. Drum 38 is positioned to receive pouch 12 from conveyor 36.

To improve the separation of the pouches 12, drum 38 can rotate to have a tip speed of each of the paddles greater than the surface speed of inclined conveyor 36. Similarly, inclined conveyor 36 can operate at a faster rate than the discharge conveyor 34. The increase speed in the next downstream components tends to pull each pouch into the next component enhancing the separation of the pouches.

A second guide 40 is radially spaced from and extends circumferentially about drum 38. The guide 40 extend over a flat conveyor belt 46. The spacing between the guide 40 and the drum 38 and between guide 40 and conveyor belt 46 is approximately equal to the thickness of the pouch 12.

Flat conveyor belt 46 is configured with a substantially triangular travel path. Flat conveyor 46 has a first section 47 for receiving the oriented pouch 12 from drum 38 and guide 40 and a second section 49 spaced from egg belt 44. First section 47 transports the pouch 12 from the drum 38 to the egg belt 44. Second section 49 cooperates with egg belt 44 to urge each pouch 12 against the second section 49 during transport thereof.

Egg-type conveyor 44 is positioned with respect to second section 49 of conveyor 46 to define a vertical path extending therebetween. Egg-type conveyor 44 has a plurality of flexible semi-circular ridges 45. The egg belt surface is common to the poultry and egg processing industry. The ridges 45 conform to the shape of the pouch 12 as it is pinched or sandwiched between the conveyor 46 and the egg-type conveyor 44, thereby holding the oriented pouches 12 in a fixed orientation from the guide 40. The flexible nature of the ridges 45 on the egg conveyor 44 holds the pouch 12 without damaging it and prevents pouch 12 from losing its longitudinal orientation as it is transported downwardly.

A first guide chute 48 is positioned below egg conveyor 44 and conveyor 46 for receiving the pouches 12. The inner surface 50 of first guide chute 48 has a frusto-conical surface which prevents the longitudinally oriented pouches 12 from rotating and losing orientation during the slide down the chute 48.

Conveyor 52 is positioned at the discharge end of chute 48 to receive each pouch 12. Conveyor 52 communicates with the third stage S3 to deliver oriented and separated pouches 12.

Third stage S3 is a duplicate of second stage S2. Third stage S3 has an inclined conveyor 54, a rotating drum 56, paddles 57, a guide 60, a belt conveyor 64, an egg belt conveyor 66, a chute 68 and a conveyor 72. Each component of third sage S3 is identical to the respective components of second stage S2.

The third stage S3 is positioned to communicate with second stage S2. Inclined conveyor 54 receives each pouch 12 from conveyor 52.

The third stage S3 communicates with the injector 11. I1 comprises an flat conveyer 76 and an egg conveyor 78. Egg conveyor 78 overlies flat conveyor 76 to define a path therebetween. Preferably, the speed of conveyor flat conveyor 76 and egg conveyor 78 is faster than horizontal belt 72. If the relative speed of conveyors 76 and 78 is about 25%greater than that of conveyor 72, then as a pouch 12 is transported from horizontal belt 72 to conveyors 76 and 78, conveyors 76 and 78 will grab and pull each successive pouch ensuring separation of pouches and thereby reduce the chance of two pouches 12 being deposited into the package 80.

It can now readily be understood by those skilled in the art that the quantum of increased relative speed of the downstream conveyor will depend upon the size and nature of the pouches or products being sorted and separated. It is possible for speeds of the downstream conveyor to be in the order of up to 3 or 4 times faster than the upstream conveyor.

In the embodiment illustrated in FIG. 1 and 2, the apparatus of the present invention has a circuitous path serpentining across and about the frame. It can be readily understood by those skilled in the art that the path of the pouches could be arranged in any desired path to deliver the pouches to their final destination for processing.

Additionally, a microprocessor coupled with a sensor would cause flat conveyor 76 and egg type conveyor 78 to selectively rotate to eject a longitudinally oriented pouch into an appropriate recipient package 80 one at a time.

Each of the conveyors and drums are operatively connected to a number of motors for driving same. Such connections may be any suitable drive engagement known in the art, including chain drives, belt drives or screw drives.

In operation of the first stage S1, pouches 12 are dumped into hopper 8. The bottommost pouches will gravity feed through aperture 14 and contact the conveyor surface 18 of the inclined conveyor 16. The pouches in contact with the conveyor surface 18 will be pulled from the pile in a random manner, sometimes in clumps of pouches. The inclination of the conveyor 16 allows gravity to act upon the pouches 12 to cause the overlying pouches to slide relative to the pouches on the conveyor 16 leaving the leading edge of the pouch on the conveyor available for grabbing by the next component, thereby effecting an initial staggering or separation of the pouches.

The counter-rotating drums 22 will engage the leading edge of the pouch. The plurality of radially extending paddles 24 will successively engage and carry the pouches as the drum rotates. The successive engagements and rotation will vibratingly separate the pouches and discharge a stream of substantially separated pouches 12. The rotation of the drum moves the pouch 12 over top of the receiving drum and then downwardly between the two drums 22. The speed of rotation of the counter-rotating drums is faster than the speed of the conveyor 18. The receiving drum 23 will pull the pouch 12 off of the conveyor 18 to separate the pouch from any overlying pouch. The receiving drum 23 will engage the next successive pouch on conveyor 18.

Each pouch 12 is agitated or jostled by the rotating paddles 24 as the pouch 12 is driven between the rotating drums 22 between guides 26. The jostling and agitating action caused by the rotating paddles 24 urges each pouch 12 to orient in a direction substantially parallel to the wall surfaces 30 of the guides 26, thereby longitudinally orienting each pouch 12. Each pouch 12 is deposited on conveyor 34 substantially separated and oriented.

In some cases, the pouches 12 may be adequately separated and oriented by the first stage S1. However for other types of pouches, additional separation and orientating stages may be necessary to separate and orient the pouches.

Referring back to FIG. 1, the pouch 12 is transported along conveyor 34 to the second stage S2. Inclined conveyor 36 receives pouches 12 and will urge overlying pouches, if any, to slide relative to the pouch in contact with the conveyor 36. Drum 38 will grab the leading edge of each pouch 12. Similar to the first stage, drum 38 is rotating at a tip speed greater than that of the conveyor 36. The pouch 12 will travel about drum 38 between the paddles 39 and guide 40 and then to conveyor 46. Conveyor 46 will then transport the pouch 12 downwardly to chute 48 and then to conveyor 52.

The pouch 12 is transported along conveyor 52 to the second stage S3. Inclined conveyor 54 receives pouches 12 and will urge overlying pouches, if any, to slide relative to the pouch in contact with the conveyor 54. Drum 56 will grab the leading edge of each pouch 12. Similar to drums 22 and 38, drum 56 is rotating at a speed greater than that of the conveyor 54. The pouch 12 will travel about drum 56 between the paddles 57 and guide 60 and then to conveyor 64. Conveyor 64 will then transport the pouch 12 downwardly to chute 68 and then to conveyor 72.

The pouch 12 is then transported to the injector I1. Conveyors 76 and 78 will grab each successive pouch 12 from conveyor 72 and will eject the now oriented and separated pouch 12 into package 80.

In the preferred embodiment of the first stage S1, two counter-rotating drums 22 have been illustrated. However, as is now apparent to those skilled in the art, one of the drums 22 can be replaced by a guide as described in stages S2 and S3.

Figure 3:
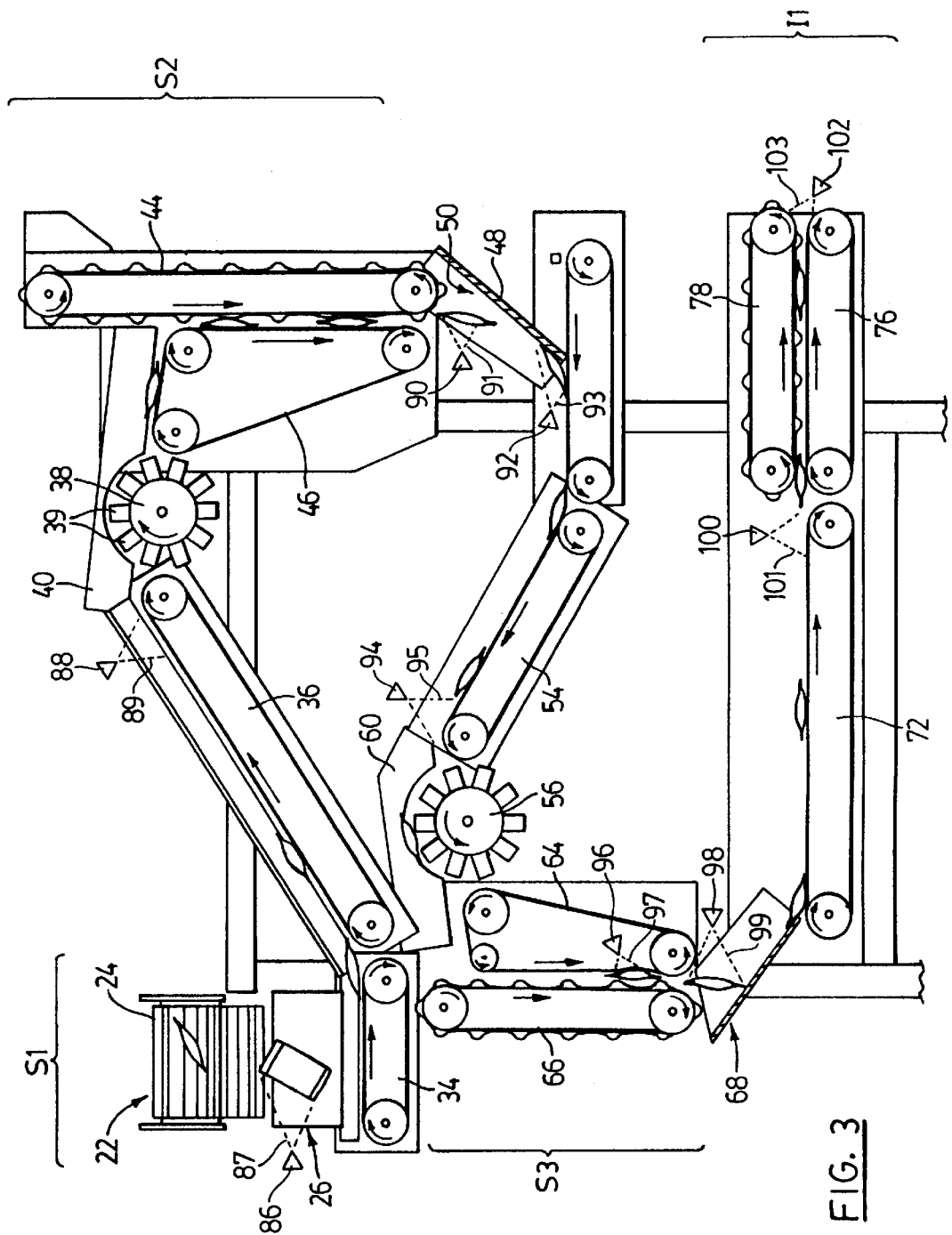
FIG. 3 is a side elevational view of the apparatus of FIG. 1, illustrating the sensors for controlling the efficient throughput of the apparatus.

Referring to FIG. 3, a series of sensors 86, 88, 90, 92, 94, 96, 98, 100, and 102, are positioned throughout the apparatus to detect the location of pouches 12 at different locations along the path. Preferably, the sensors include a signal generator to emit a signal, such as a laser beam, which is reflected off the pouch 12 as is passes through the field of view or breaks the light beam and a photo electric eye which detects the presence or absence of the laser beam and generates a corresponding detection signal. In each case, the detection signal is sent to a control computer processor which initiates a responsive action as described below.

Sensor 86 emits a detection beam 87 immediately below counter-rotating wheels 22. Sensor 88 emits detection beam 89 to detect the presence of a pouch 12 at the top of inclined conveyor 36. Sensor 90 emits detection beam 91 near the bottom of the vertical transport path of conveyor 46 and egg conveyor 44. Sensor 92 emits detection beam 93 to detect a pouch 12 at the bottom of guide chute 48. Sensor 94 emits detection beam 95 to detect the presence of a pouch 12 at the top of inclined conveyor 54. Sensor 96 emits detection beam 97 to detect the presence of a pouch 12 near the bottom of egg conveyor 66 and conveyor 64. Sensor 98 emits detection beam 99 to detect the presence of a pouch falling from conveyors 66 and 64 onto guide chute 68. Sensor 100 emits a detector beam 101 to detect the presence of a pouch 12 at the end of discharge conveyor 72 at a point adjacent to conveyors 78 and 76. Sensor 102 emits detection beam 103 to detect the presence of a pouched product 12 near the end of the dispensing means 74.

In operation, the sensors are coordinated to control various conveyors and rotating drums as follows. If a pouch 12 is detected by sensor 102 at the injector I1, belts 76 and 78 are signalled to stop. This is the first step in staging pouched product 12 so that it is ready to be inserted into a container 80. Next, sensor 100 detects whether a pouch 12 is at the downstream end of the discharge conveyor 72. If not, conveyor 72 is engaged after sensor 98 detects a pouch 12 sliding down chute 68. If sensor 96 detects a pouch 12 then conveyors 64 and 66 can be disengaged retaining a pouch ready for delivery to chute 68. If a pouch 12 is detected by sensor 94, then inclined conveyor 94 can be disengaged. If not, conveyor 94 is engaged after sensor 92 detects a pouch 12 at the bottom of chute 48 and operates until sensor 94 detects a pouch. If sensor 90 then detects a pouch 12 in the downstream end of the opposed counter-rotating conveyors 44 and 46, then the conveyors 44 and 46 are disengaged. If sensor 88 detects the presence of a pouched 12 at the top of the inclined conveyor 36, then inclined conveyor 36 is disengaged as product is ready to be delivered to rotating wheel 38. If sensor 86 detects the presence of a pouch 12 falling below rotating wheels 22, then rotating wheels 22 and the first inclined conveyor 16 can be disengaged.

It is contemplated that sensors helps to ensure a smooth throughput of oriented pouches in a "just in time" delivery system.

Figure 4:
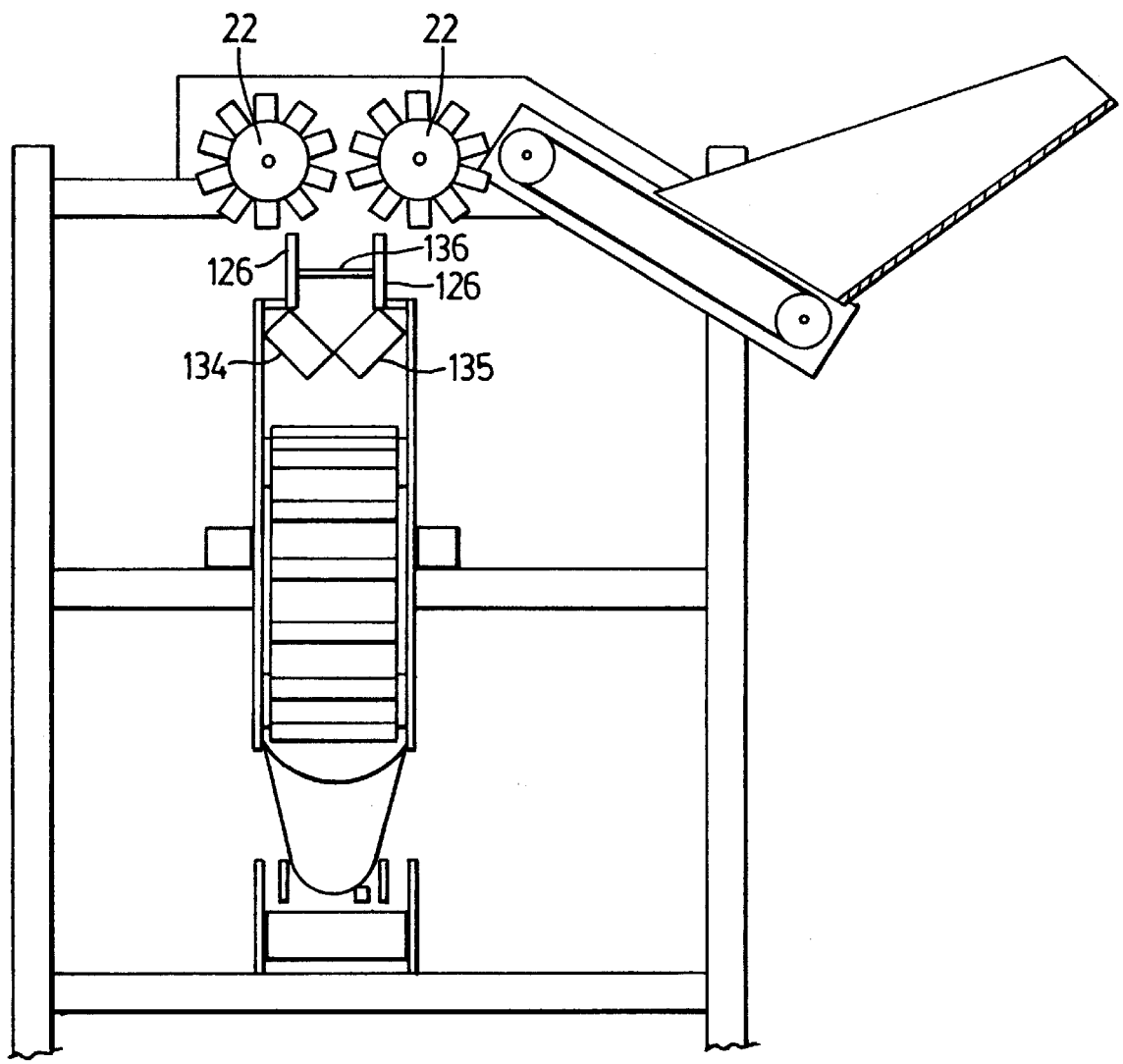
FIG. 4 is an end elevational view of a second embodiment of the first stage of the present invention.

Referring now to FIG. 4, a second embodiment of the first stage discharge conveyor is illustrated. The discharge conveyor comprises conveyors 134 and 135 arranged in a V shape. Guides 126 are spaced relatively above the conveyors 134 and 135 for orienting pouches as each falls from between drums 22. Guides 126 has a bar 136 at the downstream end.

In operation, pouches will fall between the guides 126 and will be oriented in a direction of the conveyors 134 and 136. The V orientation of the conveyors 134 and 136 will maintain the general orientation of pouches and will transport each pouch to the next stage. If a pouch stands on end in the general orientation, then bar 136 will tip the pouch over to put the pouch is a desired orientation. It is now understood that the height of the bar 136 will depend on the size of the pouches being processed.

It now can be appreciated that the apparatus of the present invention provides an automated device for the separation and orientation of pouched products, thereby reducing the manual labour in the pouch handling process.

The above described embodiments of the present invention are intended to be examples of the invention and alterations and modifications may be effected thereto, by those of skill in the art, without departing from the scope of the invention which is defined solely by the claims appended hereto.

I claim:

1. An apparatus for separating flexible packages having a first stage comprising:

an inclined conveyor having a lower end for receiving said flexible packages and an upper end, said inclined conveyor having an inclination sufficient for causing an overlying flexible package to slide relatively to an underlying flexible package as said flexible packages travel from the lower end to the upper end, and a drum rotatably mounted for receiving said flexible packages from said upper end, said drum having a plurality of radially extending resilient paddles for successively engaging and carrying said flexible packages as said drum rotates, said successive engagements and rotation vibratingly separating said flexible packages and discharging a stream of substantially separated flexible packages.

2. An apparatus as claimed in claim 1 wherein said apparatus further comprises a discharge conveyor for receiving and carrying away said stream of substantially separated flexible packages.

3. An apparatus as claimed in claim 2 wherein said discharge conveyor has a flat belt.

4. An apparatus as claimed in claim 2 wherein said discharge conveyor has a V-shaped belt.

5. An apparatus as claimed in claim 4 wherein said discharge conveyor has a bar spaced relative to the discharge conveyor for tipping any of the flexible packages of said stream standing on end.

6. An apparatus as claimed in claim 2 wherein said apparatus further comprises a second stage comprising:

a second inclined conveyor having a lower end for receiving said stream from said discharge conveyor and an upper end, said second inclined conveyor having an inclination sufficient for causing an overlying flexible package to slide relatively to an underlying flexible package as said stream travels from the lower end to the upper end, a second drum rotatably mounted for receiving said stream from said upper end, said second drum having a plurality of radially extending resilient paddles for successively engaging and carrying said flexible packages of said stream as said drum rotates, said successive engagements and rotation vibratingly separating said flexible packages and discharging a second stream of substantially separated flexible packages a second discharge conveyor for transporting said second stream to an arcuate chute, an arcuate chute for receiving said second stream and aligning each flexible package of said second stream, and a third discharge conveyor for receiving and carrying away said second stream.

7. An apparatus as claimed in claim 6 wherein said second drum rotates faster than second inclined conveyor and said second inclined conveyor rotates faster than said discharge conveyor.

8. An apparatus as claimed in claim 7 wherein second discharge conveyor has a complementary conveyor cooperating with the second discharge conveyor for retaining said second stream on said second discharge conveyor.

9. An apparatus as claimed in claim 8 wherein said complementary conveyor has an egg belt for resiliently urging said flexible packages against the second discharge conveyor.

10. An apparatus as claimed in claim 8 wherein said apparatus further comprises a third stage comprising:

a third inclined conveyor having a lower end for receiving said second stream from said second discharge conveyor and an upper end, said third inclined conveyor having an inclination sufficient for causing an overlying flexible package to slide relatively to an underlying flexible package as said stream travels from the lower end to the upper end, a third drum rotatably mounted for receiving said stream from said upper end, said third drum having a plurality of radially extending resilient paddles for successively engaging and carrying said flexible packages of said stream as said drum rotates, said successive engagements and rotation vibratingly separating said flexible packages and discharging a third stream of substantially separated flexible packages a fourth discharge conveyor for transporting said third stream to an arcuate chute, a second arcuate chute for receiving said third stream and aligning each flexible package of said third stream, and a fifth discharge conveyor for receiving and carrying away said third stream.

11. An apparatus as claimed in claim 10 wherein said third drum rotates faster than third inclined conveyor and said third inclined conveyor rotates faster than said second discharge conveyor.

12. An apparatus as claimed in claim 11 wherein fourth discharge conveyor has a second complementary conveyor cooperating with the fourth discharge conveyor for retaining said third stream on said fourth discharge conveyor.

13. An apparatus as claimed in claim 12 wherein said second complementary conveyor has an egg belt for resiliently urging said flexible packages against the fourth discharge conveyor.

14. An apparatus as claimed in claim 1 wherein said drum has a second counter-rotating drum cooperating with the drum for directing said flexible packages therebetween.

15. An apparatus as claimed in claim 14 wherein said apparatus has a guide for orienting said flexible packages being discharged from said cooperating drums.

16. An apparatus as claimed in claim 1 wherein said paddles are closed cell foam.

17. An apparatus for separating flexible packages having a plurality of stages operably connected together to serially process the flexible packages along a path moving from an upstream end to a downstream end, each of said stages having an inclined conveyor having a lower end for receiving flexible packages from an upstream side of the path and an upper end, said inclined conveyor having an inclination sufficient for causing overlying flexible packages to slide relatively to underlying flexible packages as the flexible packages travel from the lower end to the upper end, a drum rotatably mounted for receiving the flexible packages from the upper end, said drum having a plurality of radially extending resilient paddles for successively engaging and carrying the flexible packages as the drum rotates, said successive engagements and rotation vibratingly separating the flexible packages and discharging substantially separated flexible packages to a downstream side of the path.

* * * * *